May 23, 1933.　　　　　F. E. AUSTIN　　　　　1,910,080
HURDLE
Filed May 24, 1932
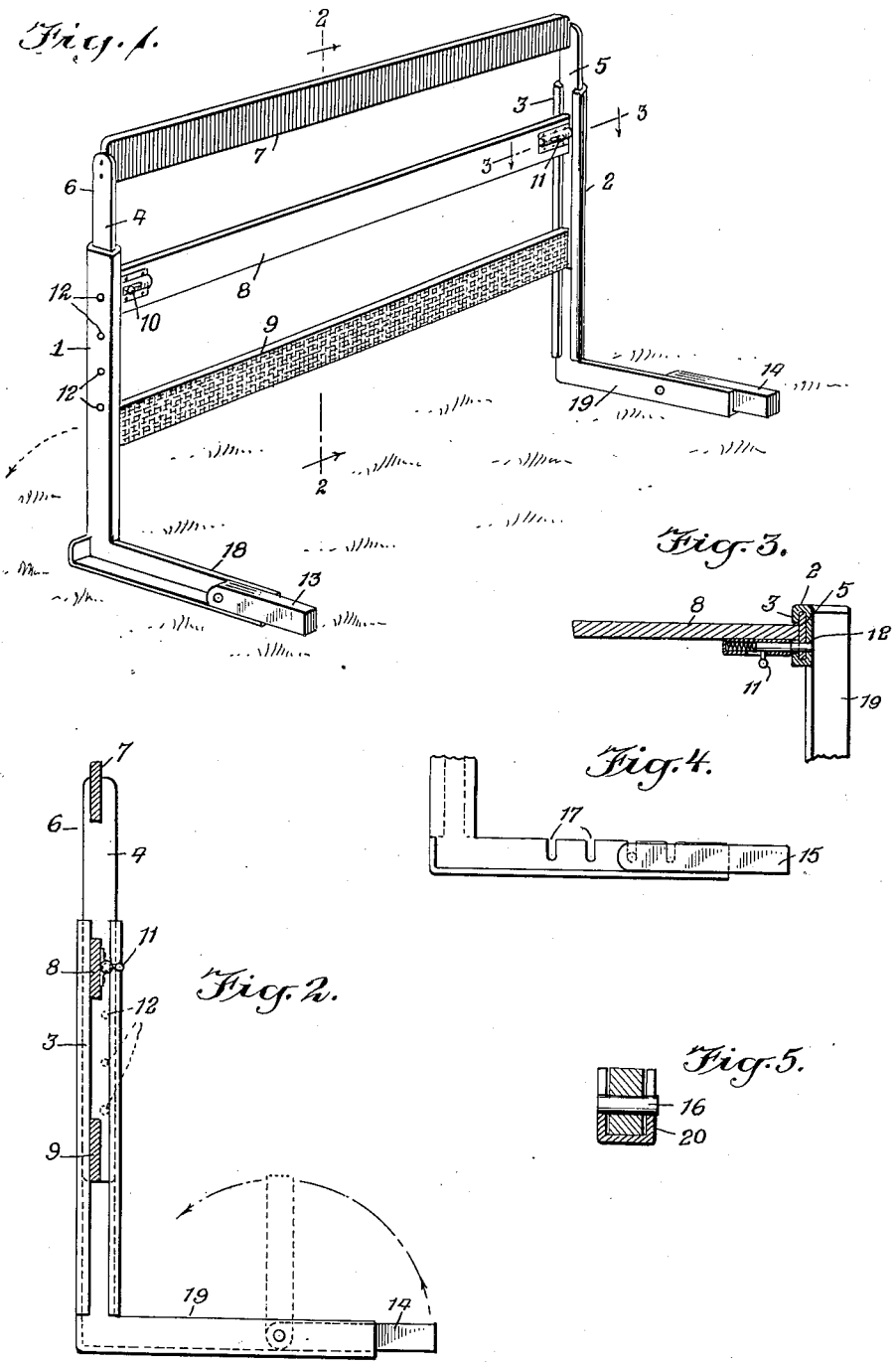
INVENTOR
F. E. Austin
BY Munn & Co.
ATTORNEYS Patented May 23, 1933

1,910,080

UNITED STATES PATENT OFFICE

FRANK E. AUSTIN, OF HANOVER, NEW HAMPSHIRE

HURDLE

Application filed May 24, 1932. Serial No. 613,314.

This invention relates to hurdles and particularly to an improved hurdle wherein the parts are arranged to permit the hurdle to be turned over without causing the top bar to rise.

Another object of the invention is to provide a hurdle wherein the base extending on one side of the supporting uprights will always permit the hurdle to turn over at the right angle juncture of the base and standards without causing the top bar to rise.

A further object of the invention is to provide a hurdle wherein swinging or adjustable weights are used on the base to require a certain pressure on the top bar to turn over the hurdle regardless of the height thereof.

An additional object, more specifically, is to provide a hurdle wherein the cross bar frame may be vertically adjusted to present different heights of hurdle and also may be inverted in case the top bar should be broken.

In the accompanying drawing—

Figure 1 is a perspective view of a hurdle disclosing an embodiment of the invention, the same being positioned ready for use.

Figure 2 is a sectional vew through Figure 1 on line 2—2.

Figure 3 is a detailed fragmentary sectional view through Figure 1 on line 3—3.

Figure 4 is a side view of a base arm showing a modified form of the invention, certain parts being broken away for better illustrating the counter-balancing weight and associated parts.

Figure 5 is a detailed fragmentary transverse sectional view through a base showing a modified form to that illustrated in Figures 1 and 4.

Referring to the accompanying drawing by numerals, 1 and 2 indicate standards which present channels having inturned flanges 3 for receiving the uprights 4 and 5 of the cross bar frame 6. Rigidly secured to these uprights are cross bars 7, 8 and 9, cross bar 7 as shown in Figure 1 acting as the top bar. However, the cross bar frame may be entirely removed from the standards, inverted and reinserted whereupon the bar 9 would be the top bar. This would be done in case the top bar should be broken.

Spring pressed bolts 10 and 11 are mounted on the cross bar 8, said bolts being adapted to project into any of the apertures 12 in the respective standards 1 and 2. As shown in Figures 1 and 2, the bolts 10 and 11 are in the highest aperture 12 and consequently the top bar 7 is as high as the same can be raised in this particular hurdle. As an example, it may be said that the bar 7 is shown as being 3 feet, 6 inches above the ground. If the cross-bar frame were moved down to the second aperture from the top, the top bar 7 would be 3 feet from the ground. If the bolts were again moved to engage the third aperture from the top, the top bar would be 2 feet, 6 inches from the ground and if it were moved to the bottom aperture the top bar 7 would be 2 feet from the ground. By reason of this adjustment, the hurdle can be used for these different heights. If desired, the standards could be made taller and greater height secured without departing from the spirit of the invention.

When the height of the top bar is varied, usually the respective weights 13 and 14 are moved. In the position shown in Figure 1, the weights would indicate that the top bar 7 is at its highest point, but if the cross bar frame were moved down to lower positions, either one or both bars would be swung over to point in the opposite direction and in that way permit the same pressure on the top bar when knocked over.

In Figure 4, a modified arrangement in connection with the weights is shown wherein the weight 15 is provided with a pin 16 adapted to fit into any of the notches 17 whereby each time the cross bar frame is adjusted, the weight or weights 15 would be adjusted. If it is found desirable that an 8-pound pressure is the correct pressure against bar 7 to knock over the hurdle, weights 15 may be adjusted so that this pressure will be all that will be needed to knock over the hurdle in any of the heights to which it may be adjusted. Heretofore, usually it required more pressure to knock over the hurdle when the same was set for 2 feet than when it was set for 3 feet, 6 inches, but by adjusting the weight 15, or weights 13 and 14, the same pressure may be used. Also, heretofore, when the bases of the standard projected on each side thereof, the top bar would rise an inch or more when struck and would quite often cause a very bad fall. To obviate this and to prevent the rise of the top bar 7, the respective bases are all on one side of the standards 1 and 2 so that they will present a right angle structure with the edge at the juncture of the angle forming the fulcrum or pivotal point. These bases are preferably formed as angle irons so as to present a stiff structure and at the same time an ample width to properly rest upon the ground without being unduly heavy.

In the form shown in Figure 4, the angle iron base may be used. If desired, the U-shaped base 20 may be used as shown in Figure 5, the upstanding flanges being formed with the notches 17 for receiving the pin 16 at different times.

If desired, weight 15 could be swung over to point in the opposite direction, but it may be raised up and moved to the next notch, so that the proper counter-balancing weight will be presented.

I claim:

1. A hurdle including a pair of L-shaped standards, part of each standard acting as an upright and part as a base, the part acting as a base extending at right angles to the part acting as an upright and on one side thereof, and a cross bar frame carried by said standards.

2. A hurdle including a pair of L-shaped standards one leg of each standard acting as an upright and the other as a base, a movable weight carried by each base, and a cross bar frame carried by said standards, said weights being movable along said base toward and from said uprights to regulate the amount of pressure necessary to throw over the hurdle.

3. A hurdle including a pair of L-shaped standards, each standard having one leg acting as an upright and the other as a base, a cross bar frame slidingly mounted in said uprights, and means for locking the cross bar frame at different heights.

4. A hurdle including a pair of standards, each standard having an upright provided with inturned edges for forming slide-ways, a cross bar frame slidingly mounted in said slide-ways, said cross bar frame having a plurality of bars, two of which are outside bars, and a pair of end bars, said end bars being slidingly mounted in said slide-ways whereby the frame may be inverted so that either of the outside bars may act as a top bar.

5. A hurdle including a pair of standards, each standard having an upright and a base extending from the lower end of the upright on one side only thereof, weights carried by each base adjustable toward and from said upright and a cross bar frame carried by said standards.

6. In a hurdle, a pair of standards, each standard being substantially L-shaped, one leg of the L acting as the base and the other as the upright.

FRANK E. AUSTIN.